United States Patent
Bates et al.

(10) Patent No.: US 8,399,872 B2
(45) Date of Patent: Mar. 19, 2013

(54) SYSTEM AND METHOD FOR USING AN OPTICAL ISOLATOR IN LASER TESTING

(75) Inventors: Kenn S. Bates, Lakewood, CA (US); Gene Paul Cochran, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 555 days.

(21) Appl. No.: 12/629,680

(22) Filed: Dec. 2, 2009

(65) Prior Publication Data

US 2011/0127411 A1    Jun. 2, 2011

(51) Int. Cl.
*G02B 27/00*     (2006.01)
*G06M 7/00*     (2006.01)

(52) U.S. Cl. ........................................ 250/551; 250/221

(58) Field of Classification Search .............. 250/214 R, 250/221, 206, 205, 214.1, 551; 359/484.03, 359/484.02, 484.08, 484.1; 356/4.01, 4.02, 356/3, 5.01; 372/29.01, 29.011, 29.014, 372/50.21, 109; 385/4, 8, 7
See application file for complete search history.

(56) References Cited

U.S. PATENT DOCUMENTS

| | | | | |
|---|---|---|---|---|
| 5,282,014 | A | * | 1/1994 | Ruhl et al. ................... 356/4.02 |
| 7,307,258 | B2 | * | 12/2007 | Tao et al. .................... 250/341.1 |
| 2005/0088641 | A1 | * | 4/2005 | Hung et al. .................. 356/4.02 |
| 2006/0039071 | A1 | | 2/2006 | Naylor et al. ................. 359/501 |

FOREIGN PATENT DOCUMENTS

GB     1 475 374 A     6/1977

OTHER PUBLICATIONS

Notification of Transmittal of the International Search Report and the Written Opinion of the International Searching Authority, or the Declaration; International Application No. PCT/US2010/056927; International Filing Date: Nov. 17, 2010.

* cited by examiner

*Primary Examiner* — Pascal M Bui Pho

(74) *Attorney, Agent, or Firm* — Lando & Anastasi, LLP

(57) ABSTRACT

According to one embodiment, a method includes receiving a first optical signal at a pulse detector. An electronic pulse of the first optical signal is received at an optical module. A second optical signal is generated at the optical module based on the electronic pulse. At least a portion of the first optical signal is received in a reverse direction at an optical isolator and the second optical signal is received in a forward direction at the optical isolator. The optical isolator substantially transmits the second optical signal to a target in the forward direction. The optical isolator substantially attenuates at least a portion of the first optical signal in the reverse direction.

24 Claims, 2 Drawing Sheets

SYSTEM AND METHOD FOR USING AN OPTICAL ISOLATOR IN LASER TESTING

TECHNICAL FIELD

Various aspects of the disclosure relate generally to lasers and optical isolators and, more specifically, to using an optical isolator in systems and methods for testing lasers and laser range finders and laser designators.

OVERVIEW

Laser range finders are generally known. Testing laser range finders and laser designators with high powered optical signals can destroy lasers, detectors, and other optical devices.

SUMMARY

According to one embodiment of the present disclosure, a method includes receiving a first optical signal at a pulse detector. The method also includes receiving an electronic pulse of the first optical signal at an optical module. The method further includes generating a second optical signal at the optical module based on the electronic pulse. The method further includes receiving at least a portion of the first optical signal in a reverse direction at an optical isolator and the second optical signal in a forward direction at the optical isolator. The optical isolator substantially transmits the second optical signal to a target in the forward direction. The optical isolator substantially attenuates at least a portion of the first optical signal in the reverse direction.

Technical advantages of particular embodiments of the present disclosure include improvements for indoor testing of laser range finder. For example, laser range finders have traditionally been tested in outdoor target ranges subject to the whims of weather. The present disclosure includes a system for indoor testing of Laser Range Finders (LRFs) including Laser Designators (LDs) and Laser Range Finder/Designators (LRF/Ds).

Another technical advantage of particular embodiments of the present disclosure includes an improved system for testing a laser range finder without damaging optical devices in the system. For example, indoor testing of laser range finders can result in damage caused by high powered optical beams or optical signals. Attenuative filters and beamsplitters have been used to reduce the damage to optical devices caused by optical signals but these filters often result in poor optical signal strength. The present disclosure includes an optical isolator that attenuates optical signals to reduce damage with or without employing filters.

Another technical advantage of particular embodiments of the present disclosure includes improvements for testing laser range finders that have a return signal strong enough to register with the detector, but weak enough to avoid damaging optical devices. For example, the present disclosure includes an optical module, a target, and a detector located in the same focal plane. The optical signal is transmitted along the focal plane through the optical isolator and is substantially unattenuated to the target and is strong enough to register with the detector.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
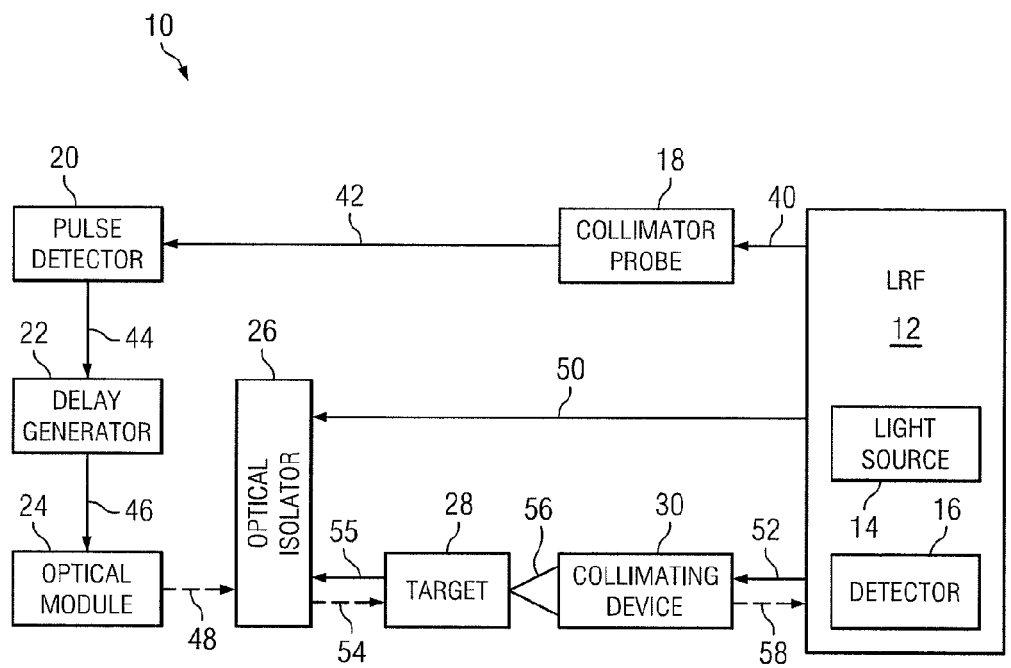
FIG. 1 is a block diagram illustrating one embodiment of a system for testing a laser range finder, in accordance with an embodiment of the present disclosure.

FIG. 1 illustrates one embodiment of a system 10 for testing a laser range finder (LRF) 12. According to one embodiment of the disclosure, placing the return optical signal on the focal plane of a collimating device may result in better alignment and good reliability when testing LRF 12. Attenuative filters and beamsplitters have typically been used to reduce damage to optics, detectors, and optical modules caused by high powered optical signals focused on the focal plane. In certain embodiments of the present disclosure, system 10 utilizes one or more optical isolators 26 located on the focal plane of, and in conjunction with, a collimating device 30 as well as an optical module 24 and a pulse detector 20. Thus, a target 28, optical module 24, and pulse detector 20 may be located on the focal plane and optical isolator 26 reduces damage to at least optical module 24 while transmitting the optical signal from optical module 24 from the focal plane to the LRF 12.

According to one embodiment of the disclosure, LRF 12 transmits and receives optical signals along a path defined by a collimator probe 18, a pulse detector 20, a delay generator 22, optical module 24, target 28, and collimating device 30. For example, LRF 12 may be optically coupled to collimator probe 18; collimator probe 18 may be optically coupled to pulse detector 20; pulse detector 20 may be electronically or optically coupled to delay generator 22; delay generator 22 may be coupled to optical module 24; optical module 24 may be optically coupled to optical isolator 26; optical isolator 26 may be optically coupled to target 28; target 28 may be optically coupled to collimating device 30; and collimating device 30 may be optically coupled to LRF 12. Although this particular implementation of system 10 is illustrated and primarily described, the present disclosure contemplates any suitable implementation of system 10 according to particular needs.

LRF 12 includes a light source 14 and detector 16, according to one embodiment of the disclosure. For example, LRF 12 may include a Laser Designator (LD) or Laser Rangefinder (LRF). As another example, LRF 12 may include a Laser Range Finder/Designator (LRF/D). As another example, LRF 12 may include a laser transceiver where light source 14 is a laser and detector 16 is a receiver unit. As another example light source 14 and detector 16 are coupled to the outside through the same optical aperture. In certain embodiments of the disclosure, LRF 12 may be referred to as a unit under test (UUT).

In certain embodiments of the disclosure, light source 14 may include any suitable device operable to transmit a first optical signal. For example, light source 14 may include a laser diode. As another example, light source 14 may include a commercial diode laser and driver unit.

In certain embodiments of the disclosure, detector 16 may include any suitable device operable to receive an optical signal. For example, detector 16 may include a photodetector. As another example, detector 16 may include a photosensor.

Collimator probe 18 may include any suitable device operable to receive the first optical signal from light source 14 and transmit the first optical signal to pulse detector 20, according to certain embodiments of the disclosure. For example, collimator probe 18 may include a fiber collimator. As another example, collimator probe 18 may include a simple fiber optic with a collimating lens. As another example, collimator probe 18 may include a simple fiber optic without a collimating lens. As yet another example, collimator probe 18 may include a simple detector. As yet another example, collimator probe 18 may include a photodiode without a fiber optic. In certain embodiments, the fiber optic is employed to eliminate any required lengths of cable from the detector which may add noise levels and make the detector less effective. According to one embodiment of the disclosure, collimator probe 18 receives the first optical signal from light source 14 and transmits the first optical signal to pulse detector 20, as indicated by reference number 40.

In certain embodiments of the disclosure, pulse detector 20 may include any suitable device operable to receive the first optical signal and detect a pulse of the first optical signal received from collimator probe 18, as indicated by reference number 42. According to one embodiment of the disclosure, once the pulse has been detected by pulse detector 20, it is passed to delay generator 22, as indicated by reference number 44. Delay generator 22 may include any suitable device operable to receive the detected pulse, establish a countdown timer, and generate an electronic pulse based on the detected pulse and the countdown timer. As indicated by reference number 46, the electronic pulse is transmitted to the optical module 24.

In certain embodiments of the disclosure, a computer may translate a user requested parameter, such as a range or distance, into a time. In certain other embodiments the computer may program the time into a countdown timer. In certain other embodiments, the computer may initialize one or more instruments to receive the first optical signal and return the second optical signal. The present disclosure contemplates any other suitable implementation of a computer in system 10.

Optical module 24 may include any device operable to receive the electronic pulse of the first optical signal and generate a second optical signal based on the electronic pulse, according to certain embodiments of the disclosure. For example, optical module 24 may include a commercial diode laser and driver unit. As another example, optical module 24 may include a laser diode with sufficient circuitry to generate a second optical signal. In certain embodiments, the second optical signal includes a pulse that is transmitted from optical module 24 to optical isolator 26 over a fiber optic cable as indicated by reference number 48. In other embodiments, the second optical signal may include a pulse that is transmitted by optical module 24 over free space optics.

In certain embodiments of the disclosure, optical isolator 26 may include any suitable device operable to receive at least a portion of the first optical signal from LRF 12 in a reverse direction (as indicated by reference number 50) and the second optical signal from optical module 24 in a forward direction (as indicated by reference number 48). As another embodiment the light from the LRF 12 in a reverse direction may traverse a path through the collimating device 30 and the target 28 (as indicated by reference numbers 52 and 55) prior to reaching the optical isolator 26. Optical isolator 26 may include any suitable device further operable to substantially transmit the second optical signal to target 28 and substantially attenuate the first optical signal in the reverse direction, according to certain embodiments of the disclosure. For example, optical isolator 26 may include a Faraday isolator that operates as a one way optical diode to prevent light from coming from a reverse direction (entering the output of optical isolator 26). Thus, the Faraday isolator may block the first optical signal to protect at least optical module 24 from damage. The second optical signal from optical module 24 may be substantially transmitted in a forward direction (entering the input of optical isolator 26) and may be transmitted substantially unattenuated to target 28, as indicated by reference number 54. In certain embodiments, Faraday isolators may be wavelength dependent. In certain other embodiments, Faraday isolators may be wavelength independent.

In certain embodiments of the disclosure, target 28 may include any suitable shape operable to receive the second optical signal from optical isolator 26. For example, target 28 may include a pinhole. The shape, and more particularly the size, of target 28 may be defined by requirements of the test for LRF 12. In certain embodiments, the size is arbitrary and may be one that would guarantee a reliable range test. Target 28, in certain embodiments, may be sufficiently resilient to optical signal damage as the full power of the optical signal from LRF 12 may be focused on target 28 as indicated by reference numbers 52 and 56. In certain embodiments, optical isolator 26 may be positioned between target 28 and light source 14 and either after or before collimating device 30. In this embodiment, at least target 28 and optical module 24 may be protected by optical isolator 26. In certain embodiments, the optical signal from LRF 12 may be attenuated using filters and beam splitters, however, the attenuation may have a negative impact on the second optical signal transmitted from target 28 to LRF 12 via collimating device 30.

In certain embodiments of the disclosure, collimating device 30 refers to any suitable device operable to receive the second optical signal from target 28, as indicated by reference number 56. For example, collimating device 30 may include a large lens. As another example, collimating device 30 may include a spherical collimating mirror. As yet another example, collimating device 30 may include a parabolic collimating mirror. Collimating device 30 may be used to achieve a boresight referenced to the LRF 12 boresight within a particular field of view (FOV).

In one example embodiment of operation of system 10, a first optical signal is received at pulse detector 20. A detected pulse of the first optical signal is received at delay generator 22. Delay generator 22 receives the detected pulse, establishes a countdown timer, and generates an electronic pulse based on the detected pulse and the countdown timer. The countdown timer is established and an electronic pulse is generated based on the detected pulse and the countdown timer.

Next, the electronic pulse is received at optical module 24. A second optical signal is generated at optical module 24 based on the electronic pulse. At least a portion of the first optical signal is received in a reverse direction at optical isolator 26 and the second optical signal is received in a forward direction at optical isolator 26. For example, optical isolator 26 may include a Faraday isolator that operates as a one way optical diode to prevent light from coming from a reverse direction (entering the output of optical isolator 26). Thus, the Faraday isolator may block at least a portion of the first optical signal to protect at least optical module 24 from damage. The second optical signal from optical module 24 may be substantially transmitted in a forward direction and may be transmitted substantially unattenuated to target 28. Therefore, optical isolator 26 substantially transmits the second optical signal to a target in the forward direction and substantially attenuates at least a portion of the first optical signal in the reverse direction. Additional details of an example optical isolator are described in more detail below with reference to FIG. 2.

Figure 2:
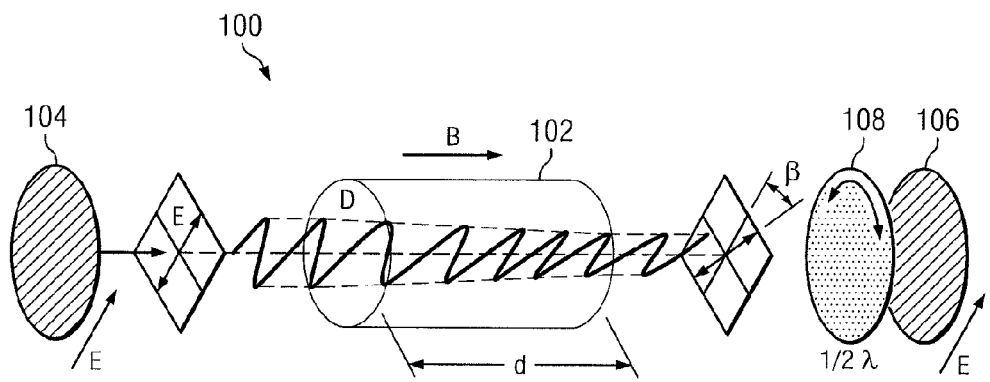
FIG. 2 is a block diagram illustrating one embodiment of an optical isolator for use in the system illustrated in FIG. 1, in accordance with an embodiment of the present disclosure.

FIG. 2 is a block diagram illustrating one embodiment of an optical isolator 100 for use in system 10 illustrated in FIG. 1, in accordance with an embodiment of the present disclosure. Optical isolator 100 may be substantially similar to optical isolator 26 described above with reference to FIG. 1. Optical isolator 100 may include a Faraday isolator that includes a Faraday rotator 102, an input polarizer 104, and an output polarizer 106. A Faraday isolator is utilized to rotate the polarization of electric field by 45 degrees in one direction independent of the direction of propagation. For example, in a forward direction, an optical signal is rotated clockwise by the Faraday rotator 102 and is unrotated by ½ wave plate 108. In the forward direction the polarization is now in its original orientation and the output polarizer 106 allows the optical signal to be transmitted. In the reverse direction, the optical signal becomes polarized at the output polarizer 106 and the ½ wave plate 108 rotates the polarization by 45 degrees counterclockwise in the direction of travel. However, in this direction the Faraday rotator 102 rotates the polarization counterclockwise as well so the signal is now polarized 90 degrees to the input polarizer 104 and is blocked. Thus, the optical signal may be substantially attenuated in the reverse direction. In certain embodiments, optical isolator 100 may be used in a free space optics system. In other embodiments, optical isolator 100 may be used in an optical fiber system or a mixed free space and optical fiber system. In other embodiments, a Faraday isolator may be utilized with an unpolarized or randomly polarized second optical signal (forward direction) without significant detrimental attenuation to the signal. In other embodiments the ½ wave plate is not required or used. Although details of the present disclosure have referred to a Faraday isolator, any suitable optical isolator or isolators may be implemented to substantially attenuate a first optical signal in a reverse direction and substantially transmit a second optical signal to a target in a forward direction. In another embodiment isolators may be ganged to maximize their reverse direction attenuative effect.

Figure 3:
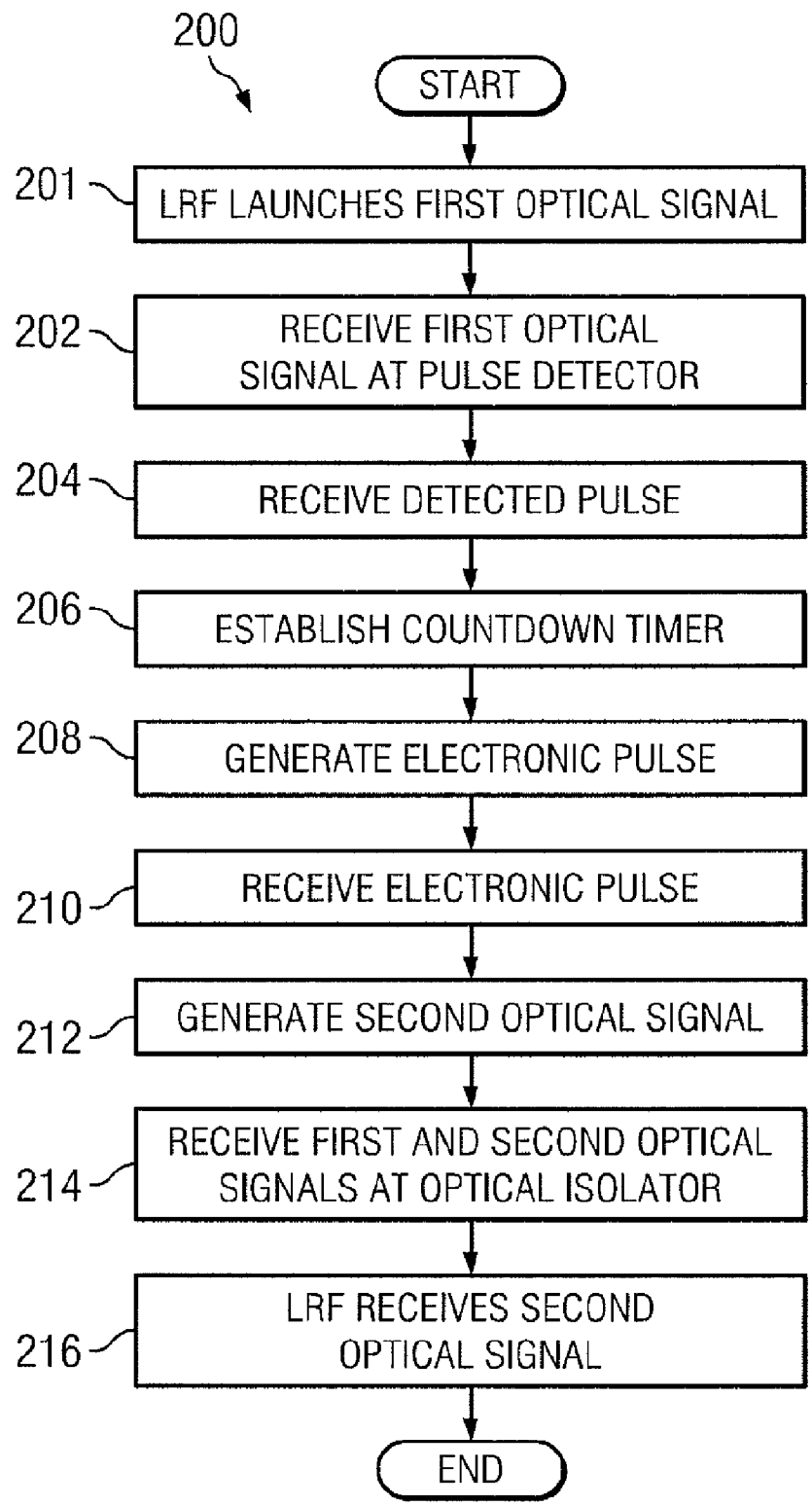
FIG. 3 is a flowchart illustrating example acts associated with a method that may be performed to test a laser range finder or laser designator, in accordance with an embodiment of the present disclosure.

FIG. 3 is a flowchart 200 illustrating example acts associated with a method that may be performed to test a laser range finder in accordance with an embodiment of the present disclosure. The example acts may be performed by system 10 and optical isolator 100 as discussed above with reference to FIGS. 1 and 2, or by any other suitable device. At step 201 the laser in LRF 12 is fired at the detector/pinhole. At step 202, a first optical signal is received at a pulse detector. For example, the pulse detector may include any suitable device operable to receive the optical signal and detect a pulse of the optical signal received from a collimator probe.

At step 204, a detected pulse of the at least a portion of the first optical signal is received at a delay generator. The delay generator may include any suitable device operable to receive the detected pulse, establish a countdown timer, and generate an electronic pulse based on the detected pulse and the countdown timer. Thus, at step 206, the countdown timer is established and at step 208 an electronic pulse is generated based on the detected pulse and the countdown timer.

At step 210, the electronic pulse is received at an optical module. At step 212, a second optical signal is generated at the optical module based on the electronic pulse.

At step 214, at least a portion of the first optical signal is received in a reverse direction at an optical isolator and the second optical signal is received in a forward direction at the optical isolator. For example, optical isolator may include a Faraday isolator that operates as a one way optical diode to prevent light from coming from a reverse direction (entering the output of the optical isolator). Thus, the Faraday isolator may block the at least a portion of the first optical signal to protect at least the optical module from damage. The second optical signal from the optical module may be substantially transmitted in a forward direction (entering the input of the optical isolator) and may be transmitted substantially unattenuated to a target. Therefore, the optical isolator is operable to substantially transmit the second optical signal to a target in the forward direction and substantially attenuate the at least a portion of the first optical signal in the reverse direction. At step 216, the laser range finder receives the second optical signal.

Thus, particular embodiments of the present disclosure include an improved system and method for testing a laser range finder without damaging optical modules in the system. For example, the present disclosure includes an optical isolator that protects at least the optical module by attenuating the first optical signal from the laser range finder and transmitting the second optical signal from the optical module.

Among other things, various embodiments described herein incorporate an optical isolator within a system for testing a laser range finder. The optical isolator may comprise a Faraday isolator. However, various embodiments may incorporate other types of optical isolators that provide the same or similar effect as a Faraday isolator. Further, although various embodiments are described with the optical isolator being located in a particular position within the system, it is envisioned that the optical isolator may be located at any suitable position within the system. Further, although various embodiments describe many components of the system, not all embodiments of the disclosure require each and every component of the system so being described.

While the present disclosure has been described in detail with reference to particular embodiments, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A method of protecting an optical module during laser testing, comprising:
   generating a first optical signal with a laser to be tested;
   receiving a first portion of the first optical signal at a pulse detector and producing a detected pulse in response thereto;
   receiving an electronic pulse based on the detected pulse of the first portion of the first optical signal at an optical module;
   generating a second optical signal at the optical module based on the electronic pulse;
   receiving a second portion of the first optical signal in a reverse direction at an optical isolator, the optical isolator being positioned between the laser and the optical module; and
   receiving the second optical signal in a forward direction at the optical isolator, the optical isolator substantially transmitting the second optical signal to a target in the forward direction, the optical isolator substantially attenuating the second portion of the first optical signal in the reverse direction to thereby protect the optical module from damage by the first optical signal.

2. The method of claim 1, the optical isolator comprising a Faraday isolator, the Faraday isolator comprising a Faraday rotator, an input polarizer, and an output polarizer.

3. The method of claim 1, further comprising:
receiving the detected pulse at a delay generator;
establishing a countdown timer in response to receiving the detected pulse; and
generating the electronic pulse based on the detected pulse and the countdown timer.

4. The method of claim 1, further comprising transmitting the second optical signal from the optical module to the optical isolator over a fiber optic cable.

5. The method of claim 1, further comprising transmitting the second optical signal from the optical module to the optical isolator over free space optics.

6. The method of claim 1, wherein substantially attenuating the second portion of first optical signal in the reverse direction comprises blocking the second portion of the first optical signal.

7. The method of claim 1, wherein substantially transmitting the second optical signal to a target in the forward direction comprises transmitting the second optical signal substantially unattenuated to the target.

8. The method of claim 1, wherein the optical isolator is positioned between the optical module and the target, and the target is positioned between the optical module and the laser.

9. The method of claim 1, wherein the optical isolator is positioned between the target and the laser.

10. The method of claim 1, the target comprising a pinhole.

11. The method of claim 1, further comprising:
providing a computer to translate a user requested parameter into a time;
programming the time into a countdown timer; and
generating the electronic pulse based on the detected pulse and the countdown timer.

12. The method of claim 1, further comprising providing a computer to initialize one or more instruments to receive the first optical signal and return the second optical signal.

13. A laser testing system, comprising:
a laser configured to produce a first optical signal;
a pulse detector operable to receive a first portion of the first optical signal and to produce a detected pulse in response thereto;
an optical module operable to receive an electronic pulse of the first optical signal and generate a second optical signal based on the electronic pulse; and
an optical isolator positioned between the laser and the optical module and operable to:
receive a second portion of the first optical signal in a reverse direction and the second optical signal in a forward direction;
substantially transmit the second optical signal to a target in the forward direction; and
substantially attenuate the second portion of the first optical signal in the reverse direction.

14. The system of claim 13, the optical isolator comprising a Faraday isolator, the Faraday isolator comprising a Faraday rotator, an input polarizer, and an output polarizer.

15. The system of claim 13, further comprising a delay generator coupled between the pulse detector and the optical module and operable to:
receive the detected pulse;
establish a countdown timer; and
generate the electronic pulse based on the detected pulse and the countdown timer.

16. The system of claim 13, the optical isolator further operable to transmit the second optical signal from the optical module to the optical isolator over a fiber optic cable.

17. The system of claim 13, the optical isolator further operable to transmit the second optical signal from the optical module to the optical isolator over free space optics.

18. The system of claim 13, the optical isolator further operable to block the first optical signal.

19. The system of claim 13, the optical isolator further operable to transmit the second optical signal substantially unattenuated to the target.

20. The system of claim 13, wherein the optical isolator is positioned between the optical module and the target, and the target is positioned between the optical module and the laser.

21. The system of claim 13, wherein the optical isolator is positioned between the target and the laser.

22. The system of claim 13, the target comprising a pinhole.

23. The system of claim 13, further comprising:
a computer operable to:
translate a user requested parameter into a time; and
programming the time into a countdown timer; and
a delay generator operable to generate the electronic pulse based on the detected pulse and the countdown timer.

24. The system of claim 13, further comprising a computer operable to initialize one or more instruments to receive the first optical signal and return the second optical signal.

* * * * *